(12) United States Patent
Van Vught

(10) Patent No.: US 8,647,046 B2
(45) Date of Patent: Feb. 11, 2014

(54) DEVICE FOR PRESENTING A PRODUCT TO A MANIPULATOR AS WELL AS SYSTEM AND METHOD FOR AUTOMATED LOADING OF A CARRIER

(75) Inventor: Gregorius Maria Adrianus Van Vught, Eindhoven (NL)

(73) Assignee: Vanderlande Industries B.V., Veghel (NL)

( * ) Notice: Subject to any disclaimer, the term of this patent is extended or adjusted under 35 U.S.C. 154(b) by 2 days.

(21) Appl. No.: 13/304,568

(22) Filed: Nov. 25, 2011

(65) Prior Publication Data
US 2012/0134770 A1 May 31, 2012

(30) Foreign Application Priority Data

Nov. 26, 2010 (NL) .................................. 2005765

(51) Int. Cl.
*B65G 1/18* (2006.01)
*B65G 57/02* (2006.01)

(52) U.S. Cl.
USPC ........................................ 414/799; 414/792.9

(58) Field of Classification Search
USPC ............. 414/793.4, 789.9, 790, 790.2, 792.7, 414/792.9, 799; 248/157
See application file for complete search history.

(56) References Cited

U.S. PATENT DOCUMENTS

| | | | | | |
|---|---|---|---|---|---|
| 2,780,340 | A | * | 2/1957 | Hynson | .......................... 198/374 |
| 3,265,186 | A | * | 8/1966 | Burton | .......................... 198/361 |
| 4,392,775 | A | * | 7/1983 | Ennis et al. | .................... 414/729 |
| 4,730,718 | A | * | 3/1988 | Fazio et al. | ................ 198/370.1 |
| 4,747,477 | A | * | 5/1988 | Benz et al. | ................. 193/35 SS |
| 5,437,534 | A | * | 8/1995 | Gales | ......................... 414/789.9 |
| 6,223,880 | B1 | * | 5/2001 | Caspi et al. | ............... 198/346.2 |
| 7,784,349 | B2 | * | 8/2010 | Wetzel | ............................ 73/663 |
| 2011/0005897 | A1 | * | 1/2011 | Schafer | ......................... 198/401 |

FOREIGN PATENT DOCUMENTS

DE 103 56 563 A1 6/2005
WO WO 2008/151812 A1 12/2008

OTHER PUBLICATIONS

International Search Report and Written Opinion issued Jul. 7, 2011, in Dutch Application No. 2005765, filed Nov. 26, 2010 (with English Translation of Category of Cited Documents).

\* cited by examiner

*Primary Examiner* — Gregory Adams
*Assistant Examiner* — Lynn Schwenning
(74) *Attorney, Agent, or Firm* — Oblon, Spivak, McClelland, Maier & Neustadt, L.L.P.

(57) ABSTRACT

The invention provides a device for presenting a product to a manipulator, comprising a transfer location provided with a number of mutually parallel first support elements, each having an elongated horizontal first support edge, and a number of strip-shaped second support elements extending parallel to each other and perpendicular to said first support elements, each having an elongated horizontal second support edge, wherein the first support elements on the one hand and the second support elements on the other hand can move vertically up and down relative to each other. This way spaces can be made between the first support elements and between the second support elements respectively, in which spaces finger means of a manipulator can be inserted for picking up a product. The invention further provides a system and a method for automated loading of a carrier.

20 Claims, 7 Drawing Sheets

DEVICE FOR PRESENTING A PRODUCT TO A MANIPULATOR AS WELL AS SYSTEM AND METHOD FOR AUTOMATED LOADING OF A CARRIER

The present invention relates to a device for presenting a product to a manipulator, which manipulator is provided with a number of finger means for supporting the product during manipulation of the product.

As an alternative to manually loading a carrier, such as a pallet or the like, it is known to use a manipulator which picks up products from a transfer location and places them on the carrier. It is important in this regard that a control system ensures that products are supplied to the transfer location in an optimum sequence, so that the carrier can be optimally loaded by means of the manipulator. Factors that may be taken into consideration when aiming at an optimally loaded carrier are, for example, utilising the total volume that can be loaded on the carrier as well as possible, but also positioning relatively heavy products lower on the carrier than relatively light products. It is further known to take into account the sequence in which the carrier, such as a roll container, can eventually be optimally unloaded, as may for example be a factor to be considered in storing shops such as supermarkets.

Usually, products have a non-square, rectangular shape, at least when seen in top view. A typical example in this regard are boxes. A transport system supplies the products to the transfer location in a specific orientation. To achieve an optimum loading of the carrier, it will as a rule be necessary for a specific product to be placed on the carrier in a specific orientation as well by the manipulator. In order to have the required freedom in such a situation, the manipulator holding the product can in certain cases approach the carrier from various directions, so that the product can be placed on the carrier in specific orientation. Under certain circumstances, however, a situation may occur in which a carrier can only be approached from one direction by the manipulator, in which connection in particular the situation in which the carrier is formed by a roll container having two opposite upright walls may be considered. In addition to that it is conceivable that the limited range of a manipulator or its limited number of degrees of freedom make it impossible to approach a carrier, such as a pallet, from more than one direction.

International patent application WO 2008/151812 describes a loading station in which products to be loaded on a carrier are supplied to a manipulator by means of a conveyor. The conveyor comprises a rotating station, by means of which it is possible to turn the product, for example through 90°, during transport by the conveyor, so that said product will be presented in a desired orientation to the manipulator, which can only approach the carrier from one side.

U.S. Pat. No. 5,193,973 describes the use of a so-called intermediate member provided with raised portions in the form of hemispherical bumps arranged in a regular matrix pattern. Identical products are supported on said raised portions and can be picked up by means of finger means that can be inserted between said raised portions from four different directions.

EP 1 462 394 A2 describes a loading system in which a conveyor supplies products individually present on a tray to a presentation position at the downstream end of the conveyor in question. The tray has a bottom in which through holes are provided in a regular pattern. At the presentation position, pins extend upward through the holes in the bottom of the tray, causing the product to be lifted. The product, being supported on the upper ends of the pins, is subsequently moved off the pins and onto a loading table. On the loading table, a pusher element subsequently moves the product across the loading table to a predetermined position, where another pusher element pushes the product onto a loading tongue. Once a number of products have been pushed onto the loading tongue in this manner, the loading tongue will retract while the pusher element will remain in the same position, so that the support for the products in question is removed and the products will fall onto a pallet present thereunder.

The object of the invention is to provide a device for presenting a product to a manipulator by means of which it is possible, using relatively simple or at least limited means, to load products on a carrier in a desired orientation, irrespective of the orientation in which said products are being supplied to a transfer location by a conveying system. In order to accomplish that object, the present invention provides a device for presenting a product to a manipulator provided with a number of fingers for supporting the product during manipulation of the product, the device comprising a transfer location provided with a number of mutually parallel first support elements each having an elongated horizontal first support edge and a number of strip-shaped second support elements extending parallel to each other and perpendicular to the first support elements and each having an elongated horizontal second support edge, wherein the first support elements and the second support elements can move vertically up and down relative to each other for assuming a first presentation position in which the first support edges are positioned higher than the second support edges and a second presentation position in which the second support edges are positioned higher than the first support edges, and spaces are present between the first support elements and between the second support elements in the first presentation position and in the second presentation position, respectively, in which spaces the fingers can be inserted for picking up a product. The transfer location makes it possible, in spite of products being supplied to the transfer location in a random orientation, to supply products in one (horizontal) direction to a carrier to be loaded and to load the products on the carrier in an optimum orientation. The products can to that end be approached from at least two (perpendicular) horizontal directions by the fingers of the manipulator because the first support elements and the second support elements are capable of assuming a first presentation position as well as a second presentation position. Reorientation of the product prior to their arrival at the transfer position is thus not necessary.

The first support elements on the one hand and the second support elements on the other hand can preferably move vertically up and down relative to each other for furthermore assuming a receiving position in which the first support edges and the second support edges are positioned at the same vertical level. Thus, the first support elements and the second support elements can jointly form a great, as it were, onto which a product to be loaded can be moved from a conveyor in a relatively simple manner.

If a receiving position as described above is used, it is furthermore advantageous if the first support edges are positioned at the same vertical level, in an absolute sense, in the first presentation position as the vertical level at which the first support edges are positioned in the receiving position and/or if the second support edges are positioned at the same vertical level, in an absolute sense, in the second presentation position as the vertical level at which the second support edges are positioned in the receiving position. In fact it comes down to this in that situation that either the first support elements or the second support elements move downwards from the receiving position so as to assume the second presentation position or the first presentation position, respectively. During such a transition, the product in question does not move spatially, so that no forces of inertia will act on the product, which forces might lead to unstable behaviour of the product, such as falling over.

In order to make it possible in a constructionally simple manner for the first support elements to be jointly moved and/or the second support elements to be jointly moved, it is preferable if the first support elements are rigidly interconnected and/or the second support elements are rigidly interconnected.

To facilitate possible maintenance, it is furthermore preferable in that case if the first support elements are detachably interconnected and/or the second support elements are detachably interconnected.

In view of the aim to realise a low cost price, it may alternatively also be very advantageous if the first support elements or the second support elements jointly form part of a single one-piece component.

In order to provide maximum flexibility as regards the position at which the finger means can be inserted between the support elements, it is preferable if the first support elements are evenly spaced and/or the second support elements are evenly spaced.

It is furthermore advantageous if the first support elements and/or the second support elements are strip-shaped, wherein furthermore preferably the transverse directions of the strip-shaped first and/or second support elements are vertically oriented.

An important preferred embodiment of the present invention is characterised in that the transfer location comprises a number of third support elements each having a supporting surface and each being provided between two adjacent first support elements and between two adjacent second support elements, wherein said third support elements can be moved vertically up and down relative to the first support elements and the second support elements, wherein the first support edges are positioned higher than the supporting surfaces in the first presentation position and wherein the second support edges are positioned higher than the supporting surfaces in the second presentation position.

The use of such third support elements has advantages in particular if they are used for being functional in a receiving position or, in other words, in the situation in which a product to be loaded is moved onto the transfer location, for example by being slid thereon from a supply conveyor. It is furthermore preferable within that framework if the third support elements can move vertically up and down relative to the first support elements and the second support elements so as to further assume a further receiving position in which the supporting surfaces are positioned at least at the same vertical level as the first support edges and/or as the second support edges. The actual support at a transfer location of a product to be loaded in said further receiving position thus takes place either exclusively by the third support elements or by the third support elements in combination with the first support elements and/or the second support elements.

In case the support of a product at the transfer location in said further receiving position takes place exclusively by the third support elements, it is furthermore preferable if the supporting surfaces are positioned at most 1 cm higher than the first support edges and/or the second support edges in said further receiving position. Thus it is possible, by lowering the third support elements carrying the product to be loaded by at most 0.5 cm until the product to be loaded comes to be supported on the first support elements and/or the second support elements, to have the transfer of the product from the third support elements to the first support elements and/or the second support elements take place with a minimal risk of instability of the product.

In particular if the support of a product at the transfer location takes place not only by the third support elements but also by the first support elements and/or second support elements, it is preferable if the first support edges are positioned at the same vertical level, in an absolute sense, in the first presentation position as the vertical level at which the first support edges are positioned in said further receiving position and/or if the second support edges are positioned at the same vertical level, in an absolute sense, in the second presentation position as the vertical level at which the second support edges are positioned in said further receiving position, as a result of which no vertical movement of the product itself is required upon assuming the first presentation position and/for the second presentation position from said further receiving position.

In order to form a maximally closed surface for supporting a product in the further receiving position, it is advantageous if the supporting surfaces have a rectangular shape, preferably a square shape. The circumferential edges of the rectangular supporting surfaces may in that case closely abut the first support elements and the second support elements.

If the supporting surfaces are slightly inclined towards the centre of the supporting surface along at least part of their circumference, sliding a product onto the third supporting surfaces can take place in a very reliable manner. Such an inclination would also be realised, for example, by rounding the circumferential edges or at least part of the supporting surface.

The present invention further provides a system for automated loading of a carrier with different products. In addition to comprising a device according to the invention as described in the foregoing, such a system also comprises a supply conveyor for supplying products to be loaded to a transfer location of the device, a loading location for accommodating a carrier to be loaded, and a manipulator provided with a number of finger means for transferring products to be loaded from the transfer location to the loading location.

Preferably, the system further comprises moving means for moving a product to be loaded from the supply conveyor to the transfer location.

The present invention further provides a method for automated loading of a carrier with different products. The method according to the invention comprises the steps of (A) determining a group of products to be loaded on a carrier, (B) determining an optimum position for each of the products of the group according to step A and an optimum orientation for loading the product in question on the carrier, (C) determining an optimum sequence for loading the individual products from the group according to step A on the carrier, (D) automated supplying of the products from the group according to step A to a transfer location in the optimum sequence according to step C, (E) causing fingers of a manipulator to approach a product supplied according to step D from one of at least two possible first directions of approach in dependence on the optimum orientation according to step B, (F) moving the fingers under the product in question from the respective first direction of approach, (G) causing the fingers to pick up the product in question, (H) causing the manipulator to move the product to a carrier, (I) causing the fingers carrying the product to approach the carrier to be loaded from a second direction of approach, (J) removing the product in question from the fingers, thereby loading the carrier with the product, such that the product in question takes up the optimum position and the optimum orientation determined in step B, (K) repeating steps E-J for each of the products forming part of the group according to step A, with the second direction of approach being the same for each of the products.

The present invention will now be explained in more detail by means of a description of a number of preferred embodiments of the device, a system and a method according to the invention, in which reference is made to the following figures.

Figure 1:
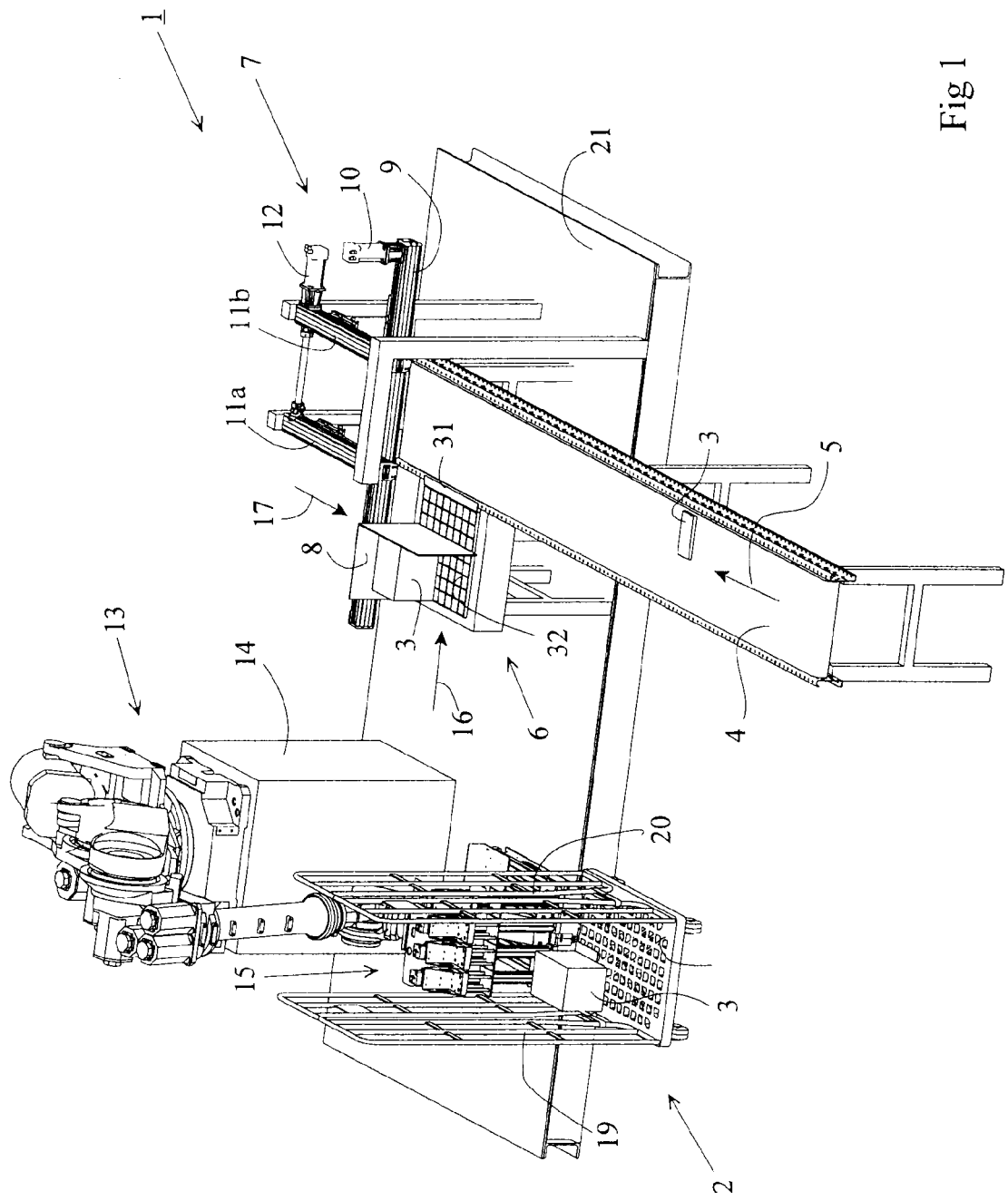
FIG. 1 is an isometric view of a system according to the invention for automated loading of a roll container.

FIG. 1 shows a system for automated loading of a carrier in the form of a roll container 2 with products 1. The system 1 comprises a belt conveyor 4 for supplying products 3 to be loaded in the conveying direction 5. At the downstream end of the belt conveyor 4, the system 1 comprises a transfer location 6 on a lateral side of the belt conveyor 4 and a sliding device 7 disposed beyond the downstream end of the belt conveyor 4. The sliding device 7 comprises a right-angled pusher element 8, which can be moved forward and backward in the longitudinal direction of the guide member 9 by suitable actuation of the drive unit 10. The guide member 9 extends transversely to the conveying direction 5 and can be moved forward and backward along guide members 11a, 11b, which extend parallel to the conveying direction 5 and thus perpendicular to the guide member 9, by actuating the drive unit 12. By actuating the drive units 10 and 12, a product 3 arriving at the downstream end of the belt conveyor 4 can be moved off the belt conveyor 4 and onto the transfer location 6. It is possible in that situation to precisely control the positioning of the product 3 at the transfer location by ensuring that the product 3 is located in the corner of the right-angled pusher element 8.

Figure 2:
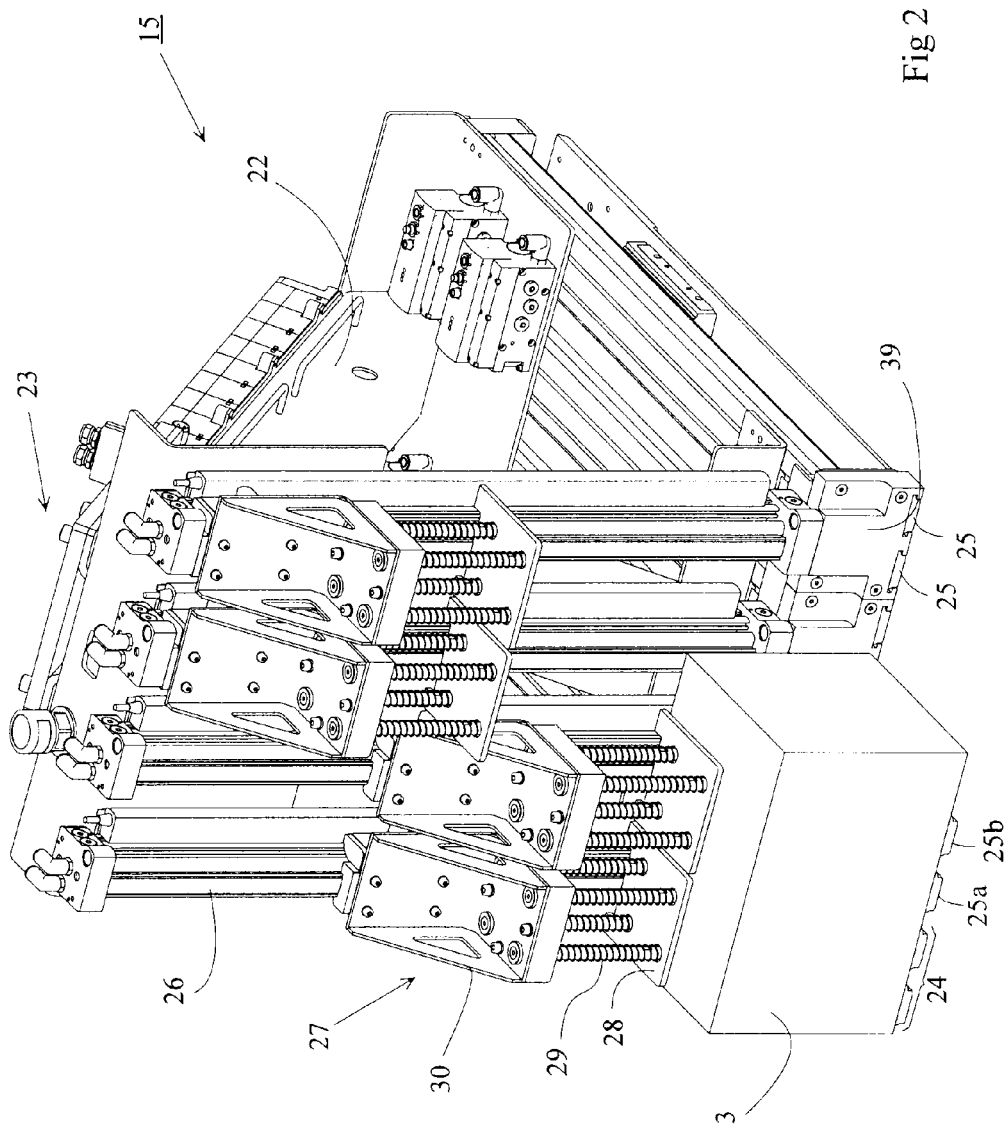
FIG. 2 is an isometric view of a gripping instrument as used in the system according to FIG. 1.

The system 1 further comprises a manipulator configured as a six-armed robot 13 mounted on a column 14. The robot 13 can be regarded as a pick-and-place robot and is to that end provided with a gripping instrument 15 at the free end of its arms, which gripping instrument is shown in more detail in FIG. 2 and which will be further discussed hereinafter. The working range of the robot 13 is such that a product 3 which is positioned at the transfer location 6 can be approached by the gripping instrument 15 from two mutually perpendicular horizontal directions, which are indicated by arrows 16 and 17 in FIG. 1. In addition to that, the working range of the robot 13 is such that the entire volume of the roll container 2 as determined by the bottom 18 and vertical walls 19, 20 can also be reached by the gripping instrument 15.

The system 1 may further comprise a platform 21, on which the column 14 with the robot 13, the transfer location 6 and the sliding device 7 is supported and against which the roll container 2 is positioned, as is shown in FIG. 1, while the roll container 2 is being loaded. The transfer location 6 is configured as a table, as it were, whose top 32 is positioned at the same height as the belt conveyor 4 or slightly lower, for example 0.5 cm, whilst a sliding strip 31 is provided between the belt conveyor 4 and the top, over which sliding strip the products 3 are moved from the belt conveyor 4 onto the top 32 of the table by means of the sliding device 7.

The gripping instrument 15 comprises a frame 22, which has at least substantially the shape of a right-angled triangle, seen in side view. On the oblique side of said triangular shape, the gripping instrument 15 comprises connecting means 23 for connecting the gripping instrument 15 to the free end of the distal robot arm of the robot 13. Such connecting means 23 are known to those skilled in the art and will not be described in more detail herein. The gripping instrument 15 further comprises four pairs 24 of strip-shaped fingers 25a, 25b, which will be generally indicated by reference numeral 25 hereinafter. The fingers 25 can be retracted and extended in their longitudinal directions in pairs between a retracted position, as shown for the four right-hand fingers 25 in FIG. 2, and an extended position, as shown for the four left-hand fingers in FIG. 2. In the extended position, the fingers 25 extend outside the triangular shape of the frame 22, with the part of the fingers 25 that projects outside the aforesaid triangular shape being capable of supporting a product 3.

On the vertical side of the triangular shape of the frame 22, a longitudinal guide 26 is provided for each pair 24 of fingers 25, along which longitudinal guide pressure means 27 can be moved vertically up and down by being pneumatically actuated. Each pressure means 27 comprises a pressure plate 28, which is spring-supported against a moving body 30 via four compression springs 29. A product 3 being supported on extended fingers 25 can be pressed onto said fingers 25 by means of pressure means 27 associated with the fingers 25, thereby realising a stable position of the product 3 in question on the fingers 25, also while the product 3 is being moved by means of the robot 13. On the bottom side of the vertical side of the triangular shape of the frame 22, the gripping instrument 15 comprises a stop surface 39 for each pair of fingers 25, against which a product 3 can abut.

Figure 3:
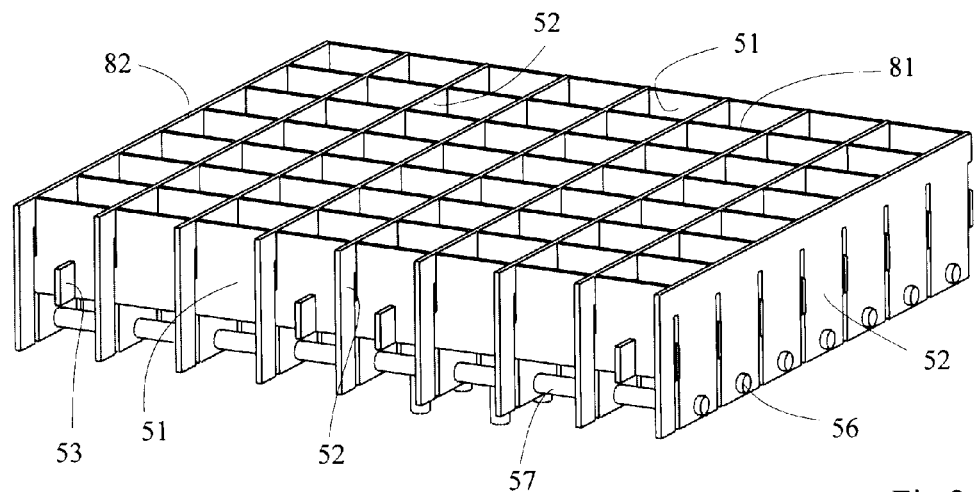
FIG. 3 is an isometric top plan view, partially in vertical section, of a first embodiment of a transfer location according to the invention in a receiving position.

FIGS. 3-5b show a first embodiment of a possible configuration of the top 32 of a transfer location 6. FIG. 3 shows the situation in which the transfer location 6 is in a receiving position. A receiving position is a position in which products 3 can be moved from the belt conveyor 4 onto the transfer location 6 by the sliding device 7.

The transfer location 6, more specifically the top 32 thereof, is configured as a grid with, in this case, nine first strip members 51 extending parallel to each other in evenly spaced relationship, and nine second strip members 52 likewise extending parallel to each other in evenly spaced relationship. The second strip members 52 extend perpendicular to the first strip members 51. The first strip members 51 and the second strip members 52 cross, jointly forming a grid, at least in the receiving position. The first strip members 51 and the second strip members 52 have an upper edge 81 and an upper edge 82, respectively. It will be understood that the number of nine is not essential to the invention, in which connection it is noted that only eight strip members are shown in FIG. 3 because of the fact that FIG. 3 is a vertical sectional view which serves to show the structure of the grid more clearly.

Figure 4:
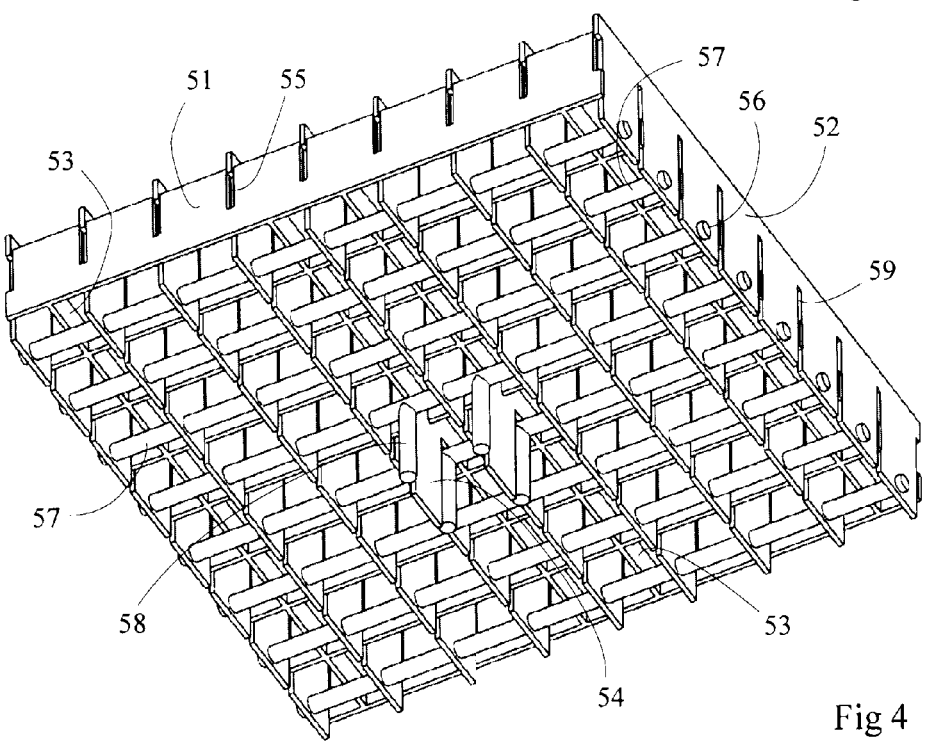
FIG. 4 is an isometric bottom view of the support location of FIG. 3 in a first presentation position.
Figure 5A:
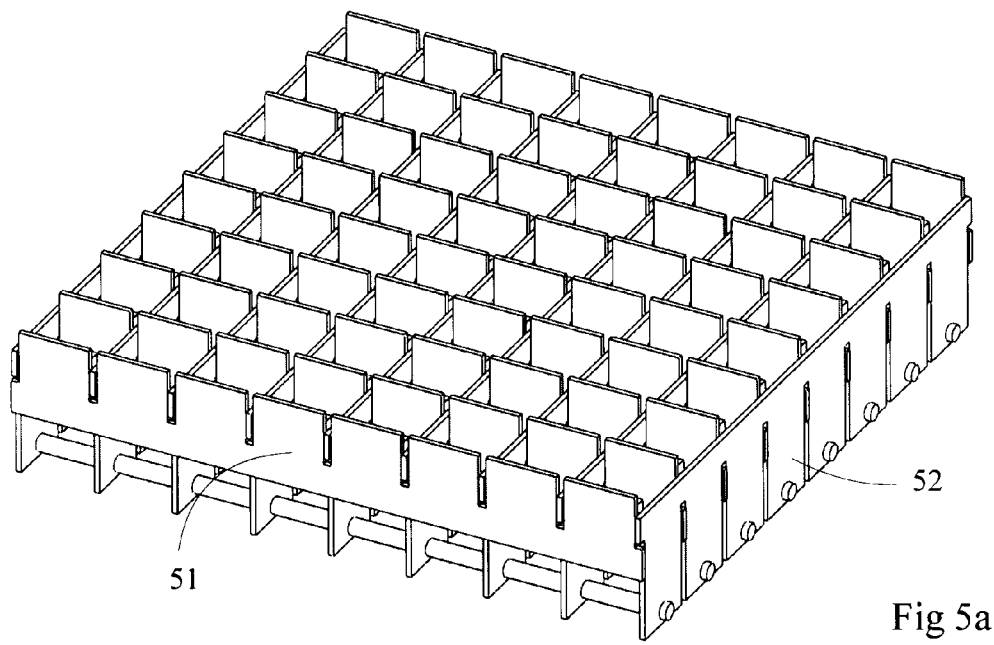
FIGS. 5a and 5b are isometric top plan views of the transfer location of FIG. 3 in a second presentation position and in the first presentation position, respectively.
Figure 5B:
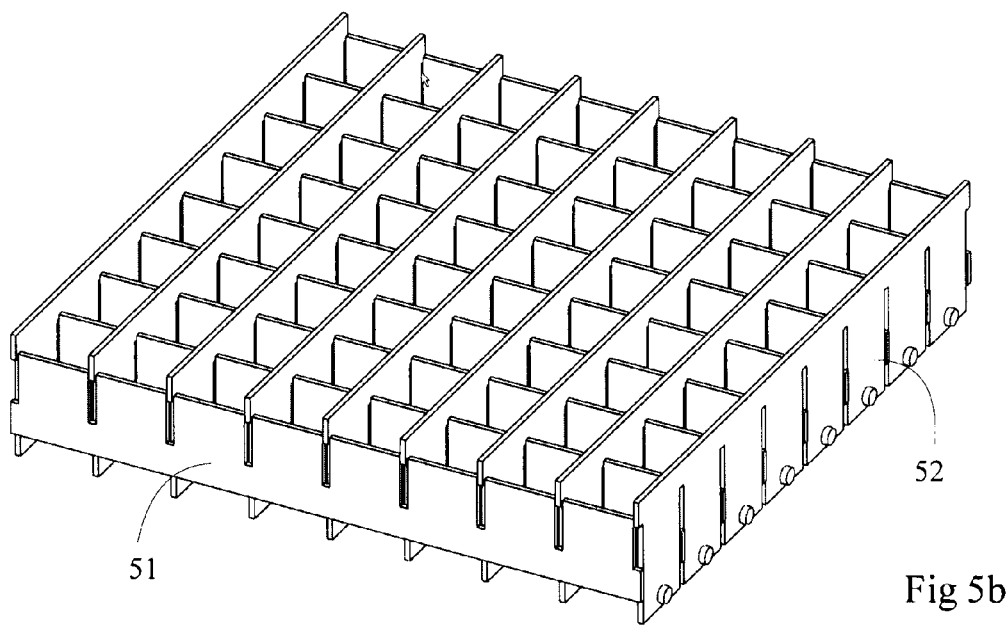
Figure 6:
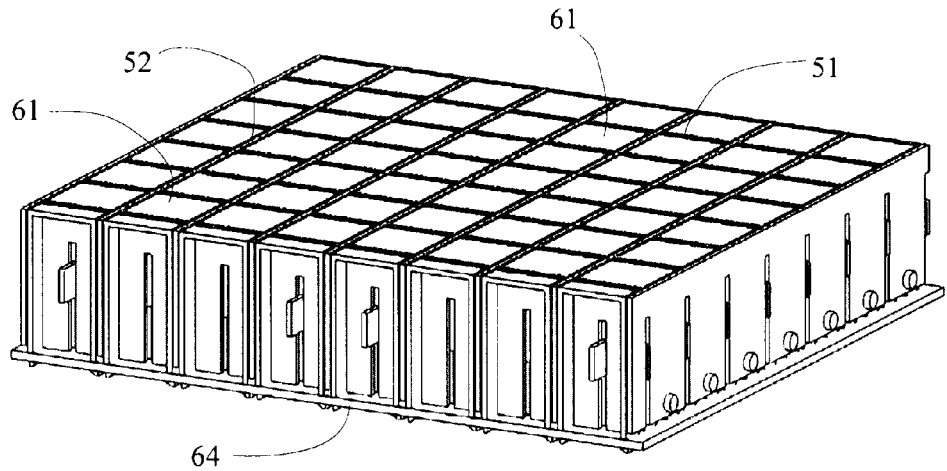
FIG. 6 is an isometric top plan view, partially in vertical section, of a second embodiment of a transfer location according to the invention in a receiving position.
Figure 7:
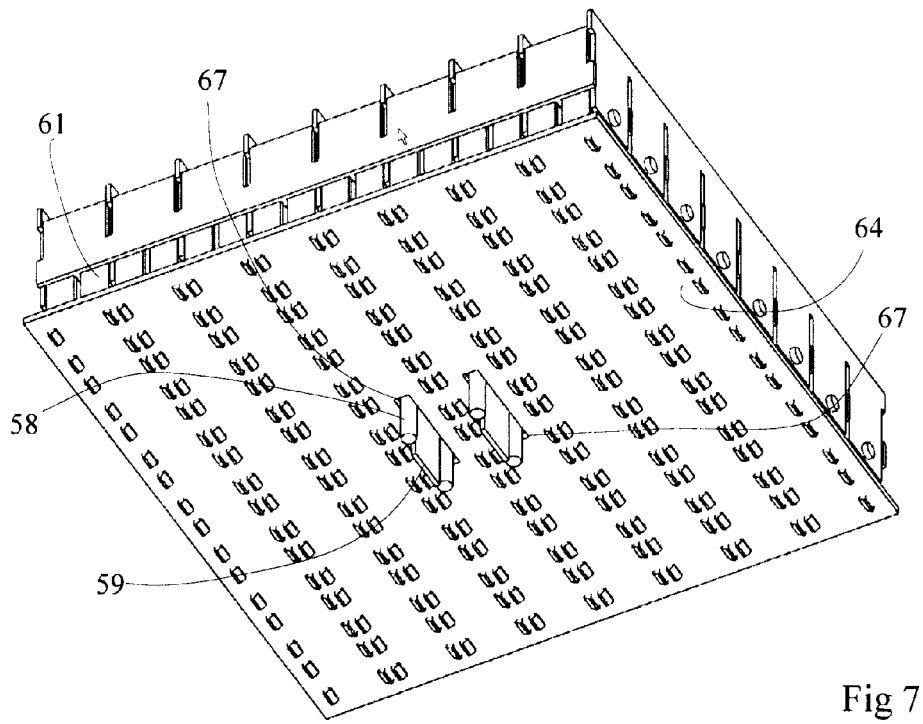
FIG. 7 is an isometric bottom view of the transfer location of FIG. 6 in a first presentation position.
Figure 8A:
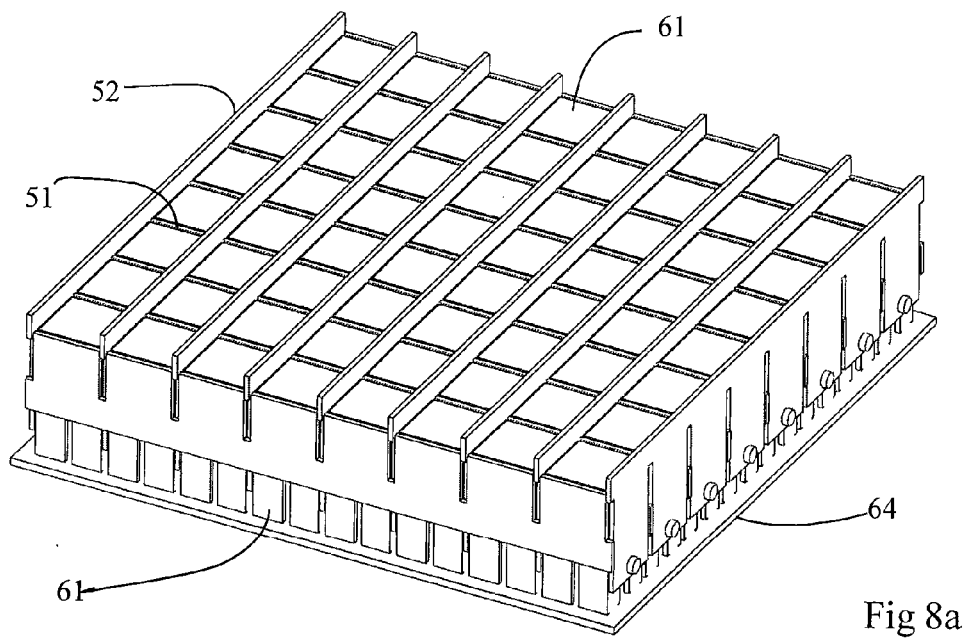
FIGS. 8a and 8b are isometric top plan views of the transfer location of FIG. 5 in the first presentation position and in a second presentation position, respectively.
Figure 8B:
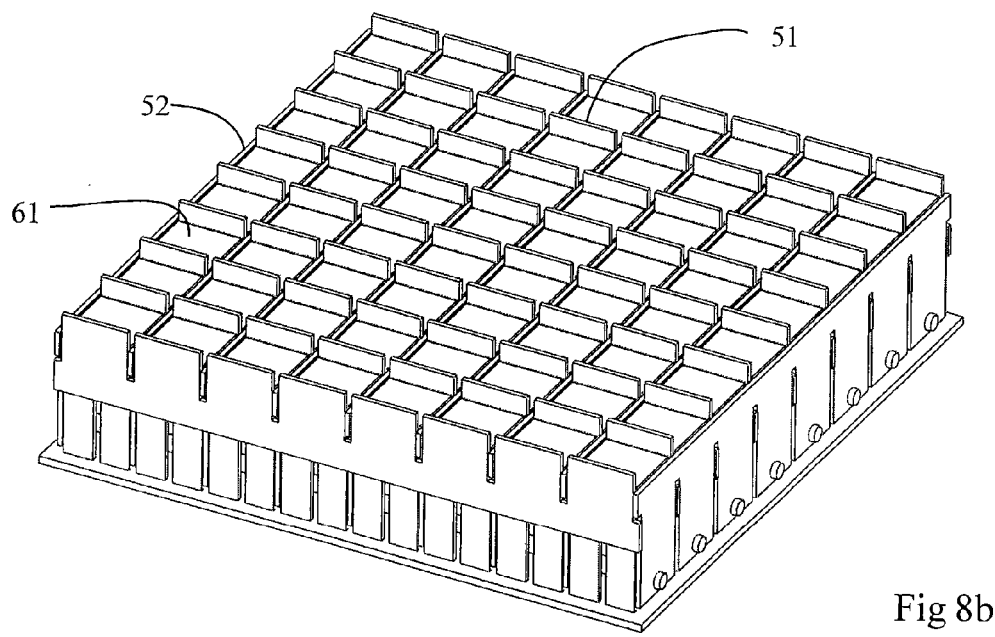

FIGS. 4, 5b and FIG. 5a show the grid of FIG. 3 in a first presentation position and a second presentation position, respectively. The presentation position is the position in which the robot 13 can insert fingers 25 under a product 3 present on the grid and subsequently grip said product 3 from above by means of an associated pressure element 27 and manipulate it so as to place it on the roll container 2.

In the first presentation position, fingers 25 can approach the product 3 from the direction 16, whilst in the second presentation position fingers 25 can approach the product from the direction 17. Whereas in the receiving position shown in FIG. 3 the upper edges of the first strip members 51 and the second strip members 52 are positioned at the same vertical level, this is precisely not the case in the first or the second presentation position. More specifically, in the first presentation position the upper edges 82 of the second strip members 52 are positioned higher than the upper edges 81 of the first strip members 51. In the second presentation position the situation is precisely the reverse: in that position, the upper edges 81 of the first strip members 51 are positioned higher than the upper edges 82 of the strip members 52. The difference in height between the upper edges 81 of the first strip members 51 and the upper edges 82 of the second strip members 52 in one of the presentation positions is at least equal to the height of the fingers 25, so that sufficient space is created for inserting the fingers 25 between the highest strip members 51 or 52 under a product 3 present thereon.

As is clearly shown in particular in FIG. 4, the nine first strip members 51 form part of a sub-grid, with four bridging strips 53 being provided between each pair of adjacent first strip members 51 in the lower half of the height of the first strip members 51. Said sub-grid may thus be configured as an integral, one-piece part, but alternatively it is certainly also possible to form the sub-grid from various parts, eventually obtaining the same configuration of the sub-grid. At the bottom side the sub-grid further comprises, in the middle of the circumference thereof, two strip-shaped engagement parts 54, which can be engaged by an actuator (not shown) for moving the sub-grid, and thus the first strip members 51, vertically up and down, so that the transfer location 6 can assume the receiving position, the first presentation position or the second presentation position. Vertical grooves 55 are provided in the upper edges of the first strip members 51, which grooves extend over slightly more than half the height of the first strip members and in which parts of strip members 52 extend.

The strip members 52 have a height greater than that of the first strip members 51. The strip members 52 are interconnected via eight tie rods 56. Each tie rod 56 extends the length of the first strip members 51, parallel thereto. Between adjacent second strip members 52, a spacer sleeve 57 is provided around each tie rod 56. Connected to the four spacer sleeves 57 located in the centre of the grid are downwardly extending engagement pins 58. An actuator (not shown) associated with the transfer location 6 engages said engagement pins 58, so that the engagement pins 58, and thus all second strip members 52, can be moved vertically up and down for assuming the receiving position, the first presentation position or the second presentation position. Vertical grooves 59 are provided in the bottom edges of the second strip members 52, within which grooves parts of the first strip members 51 extend, being capable of up-and-down movement therein.

FIGS. 6-9 relate to a second embodiment of a possible configuration of the top 32 of a transfer location 6. In fact it is an extended version of the first embodiment shown in FIGS. 3-5b. Like parts will therefore be indicated by the same numerals.

Figure 9:
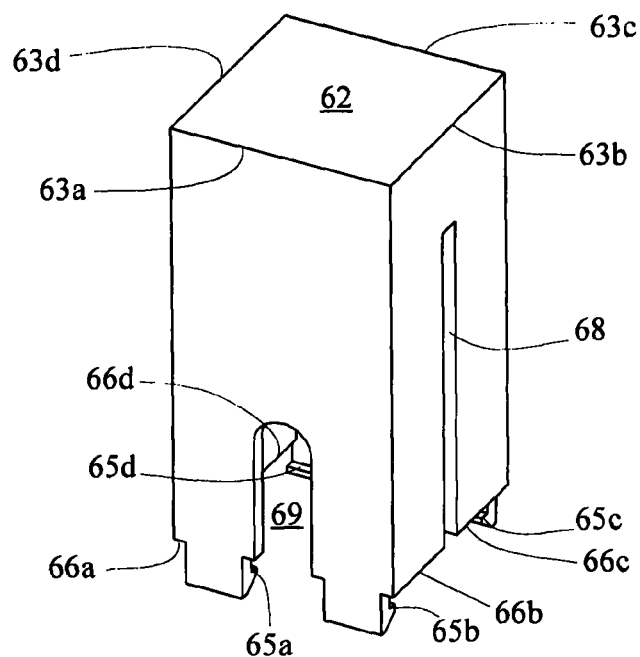
FIG. 9 shows a packing block as used with the transfer location according to FIGS. 6-8b.

The top 32 according to the second embodiment (likewise) comprises first strip members 51 and second strip members 52, which can be moved vertically up and down. In the square spaces formed between two adjacent first strip members 51 and adjacent second strip members 52, the top 32 according to the second embodiment further comprises packing blocks 61, one of which is shown in FIG. 9. At the upper side, each packing block 61 has a square supporting surface 62, which is surrounded by circumferential edge portions 63a-63d (jointly indicated at 63). The circumferential edge portions 63 are shown to be right-angled in this figure, but the edges may also be rounded. Rounded edges can help make it easier to move a product 3 onto the supporting surfaces 62 when the transfer location in question is in a receiving position. The dimension of the supporting surfaces 62 has been selected so that the circumferential edge portions 63 are spaced from the adjacent strip member 51 or 62 by a short distance, so that the upper edges of the strip members 51 or 52 and the supporting surfaces 62, when positioned at the same vertical level, as may be the case in the receiving position, will jointly form a practically continuous surface over the entire area of the top 32.

Just like the first strip members 51 and the second strip members 52, all packing blocks 61 can be jointly moved vertically up and down independently of the first strip members 51 or the second slip members 52. The packing blocks 61 are to that end interconnected via a connecting plate 64. The connecting plate 64 is provided under the first strip members 51 and the second strip members 52. Openings are provided in a regular pattern in the connecting plate 62, in which openings hooks 65a-65d are inserted with a snap fit at the bottom side of each packing block 61. Each packing block 61 further comprises stop edges 66a-66d at a distance slightly greater than the thickness of the connecting plate 62, which stop edges abut against the upper side of the connecting plate 62. Two slot-shaped larger openings 67 are provided in the centre of the connecting plate 62. Two engaging pins 58 and the engaging portion 54 present therebetween extend through each of said openings 67.

The connecting plate 62 is engaged by a (third, not shown) actuator for causing the connecting plate 62, and thus the packing blocks 61, to move vertically up and down. In order to make it possible to realise a relative up-and-down movement of the packing blocks 61 and the first strip members 51 and the second strip members 52, two abutting grooves 68 and two opposite grooves 69 are furthermore provided in each packing block 61. The grooves 68, 69 extend from the bottom side of the packing blocks 61. The grooves 68 are narrower and longer than the grooves 69. The grooves 68 are similar to the grooves 59 in the second strip members 52. In said grooves 68, parts of the first strip members 51 can move vertically up and down. Within the grooves 69, the spacer sleeves 57 are capable of (relative) vertical up-and-down movement.

In the receiving position, the upper edges 81 of the first strip members 51, the upper edges 82 of the second strip members 52 and the supporting surfaces 62 are positioned at the same vertical level. By lowering the supporting surfaces 62 and either the first strip members 51 or the second strip members 52 once a product 3 has been moved onto the grid, the product 3 will remain supported on those strip members 51 or 52 that have not been lowered. In this way a first presentation position or a second presentation position of the transfer location 6 is obtained. The product 3 can subsequently be picked up by inserting the fingers 25 between the "high" strip members 51 or 52 in one of the directions 16, 17 parallel to the high strip members 51 or 52 in question.

Figure 10A:
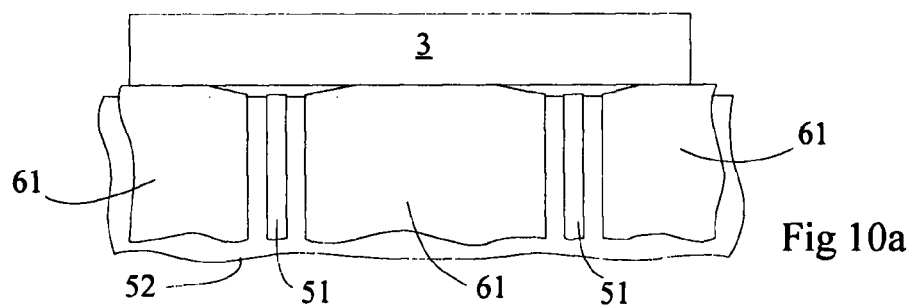
FIGS. 10a and 10b are schematic, partially transparent side views of a variant of the second embodiment in a receiving position and in a presentation position.

Alternatively it is also possible, on the contrary, for the supporting surfaces 62 to be positioned slightly higher, for example 0.5 cm higher, in the receiving position than the upper edges of the first strip members 51 or the second strip members 52. This is shown in FIG. 10*a*. A product 3 is slid onto the supporting surfaces 62 by the sliding device 7 without coming into contact with the first strip members 51 or the second strip members 52. Gaps slightly larger than the thickness of the strip members 51, 52 are thus present between the supporting surfaces 62. In the example shown in FIGS. 10*a* and 10*b*, each supporting surface 62 is slightly bevelled (with an upward inclination toward the centre) at the circumference thereof so as to facilitate moving the product 3 thereon as much as possible.

Figure 10B:
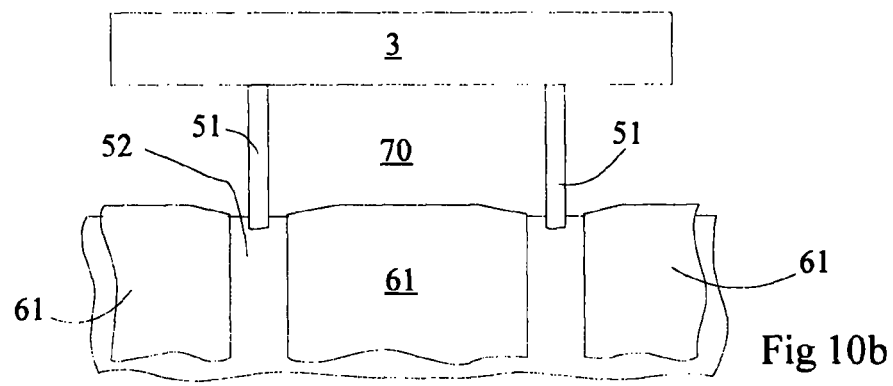

In order to realise a presentation position, the packing blocks 61 and (in this example) the second strip members 52 are now lowered. The product 3 (which is shown relatively small in FIGS. 10*a* and 10*b*) is lowered along with the packing blocks 61, preferably over a limited distance, such as 0.5 cm in this case, so that unstable behaviour of the product 3 is prevented as much as possible, until the product 3 comes to be supported on the first strip members 51 (FIG. 10*b*). The fingers 25 can subsequently be inserted between the first strip members 51 in the space thus cleared (indicated at 70) for picking up the product 3.

A system as described in the foregoing with reference to possible embodiments thereof can be used in the following manner: Disposed upstream of the belt conveyor 4 is a storage system that is known per se to those skilled in the art (as described in EP 1 462 394, for example), in which various products 3 are stored. The control system associated with said storage system receives an order for collecting a group of different products which are to be collected on a roll container 2. On the basis of properties such as the weight, the volume and a shape, the control system then determines how the roll container 2 can be loaded in the most optimum manner. More specifically, the control system determines the optimum individual positions and orientations of the individual products 3 on the roll container 2. On the basis of said analysis, products 3 associated with the order in question are taken from the storage system and supplied to the belt conveyor 4 in an optimum order and in an orientation which depends on the orientation in which the products 3 are stored in the storage system. Successive products 3 are conveyed in the conveying direction 5 by means of the belt conveyor 4 to a position at the downstream end of the belt conveyor 4. Having arrived there, the product 3 is moved off the belt conveyor 3 onto the top 32 of the transfer location 6 by means of the sliding device 7. In that situation the transfer location is in a receiving position. After the product 3 has been taken over by the transfer location 6, the transfer location 6 will assume a first presentation position or a second presentation position, depending on the orientation of the product 3 on the top 32 in relation to the determined optimum orientation of the respective product 3 on the roll container 2. Subsequently, pairs of fingers 25 are extended. The number of pairs of fingers 25 being extended depends on the width of the product 3 (seen in the longitudinal direction of the fingers 25), whilst the extent to which the fingers 25 are extended corresponds to the depths of the product 3. The robot 13 then moves the (extended) fingers 25 in the approaching direction 16, 17 associated with the presentation position in question, directly under the product 3, for which purpose space has been created by assuming the respective presentation position. After or shortly before the stop surfaces 39 associated with the extended fingers 25 strike against the product 3, the movement by the robot in the approaching direction 16, 17 in question stops and the robot 13 moves the fingers 25 slightly upwards, so that they come to be positioned slightly above the level of the top 32. The pressure means 27 associated with the extended fingers 25 are moved downwards for clamping down the product 3. The robot 39 then moves the gripping instrument 15 with the product 3 to the roll container 2, in such a manner that the fingers 25 extend parallel to the walls 19, 20 of the roll container 2. To load the roll container 2, the robot 13 then moves the arms 25 further in their longitudinal direction toward the roll container 2, until the product 3 is positioned over the optimum loading position as determined for the product 3. At that position, the pressure means 27 move upward and the extended fingers 25 are retracted again and thus moved out from under the product 3, with the product 3 abutting against the associated stop surfaces 39. Said retracting of the fingers 25 takes place at a speed so high that the products 3 fall straight down onto the optimum position. This process is repeated for all the products 3 included in the order, until all the products 3 in question are loaded on the roll container 2.

The invention claimed is:

1. A device for presenting a product to a manipulator, which manipulator is provided with a plurality of fingers for supporting the product during manipulation of the product and which manipulator is configured to move the fingers to approach the product from two mutually perpendicular horizontal directions, said device comprising
   a transfer location comprising a plurality of mutually parallel first support elements, each having an elongated horizontal first support edge, and a plurality of second support elements extending parallel to each other and perpendicular to said first support elements, each second support element having an elongated horizontal second support edge, wherein said parallel first support elements and said parallel second support elements respectively extend in said two mutually perpendicular horizontal directions,
   wherein the first support elements and the second support elements can move vertically up and down relative to each other for assuming a first presentation position in which the first support edges are positioned higher than the second support edges, and a second presentation position in which the second support edges are positioned higher than the first support edges, and
   wherein spaces extending in one of said two mutually perpendicular horizontal directions are present between the first support elements when the first and second support elements assume the first presentation position, and wherein spaces extending in the other of said two mutually perpendicular horizontal directions are present between the second support elements when the first and second support elements assume the second presentation position, in which spaces the fingers of the manipulator can be inserted for picking up a product.

2. A device according to claim 1, wherein the first support elements and the second support elements can move vertically up and down relative to each other for furthermore assuming a receiving position in which the first support edges and the second support edges are positioned at the same vertical level.

3. A device according to claim 1, wherein at least one of the first support elements and the second support elements respectively comprise elements that are rigidly interconnected.

4. A device according to claim 3, wherein at least one of the first support elements and the second support elements respectively comprise elements that are detachably interconnected.

5. A device according to claim 3, wherein the first support elements or the second support elements jointly form part of a single one-piece component.

6. A device according to claim 1, wherein at least one of the first support elements and the second support elements respectively comprise elements that are evenly spaced.

7. A device according to claim 1, wherein at least one of the first support elements and the second support elements respectively comprise elements that are strip-shaped.

8. A device according to claim 7, wherein the transverse directions of at least one of the strip-shaped first and second support elements respectively comprise elements that are vertically oriented.

9. A system for automated loading of a carrier with different products, comprising a system according to claim 1, a supply conveyor for supplying products to be loaded to a transfer location of the device, a loading location for accommodating a carrier to be loaded, and a manipulator provided with a number of fingers for transferring products to be loaded from the transfer location to the loading location.

10. A system according to claim 9, wherein the system further comprises moving means for moving a product to be loaded from the supply conveyor to the transfer location.

11. A device for presenting a product to a manipulator, which manipulator is provided with a plurality of fingers for supporting the product during manipulation of the product, said device comprising:
a transfer location comprising a plurality of mutually parallel first support elements, each having an elongated horizontal first support edge, and a plurality of second support elements extending parallel to each other and perpendicular to said first support elements, each second support element having an elongated horizontal second support edge,
wherein the first support elements and the second support elements can move vertically up and down relative to each other for assuming a first presentation position in which the first support edges are positioned higher than the second support edges, and a second presentation position in which the second support edges are positioned higher than the first support edges, and
wherein spaces are present between the first support elements when the first and second support elements assume the first presentation position, and wherein spaces are present between the second support elements when the first and second support elements assume the second presentation position, in which spaces the fingers of the manipulator can be inserted for picking up a product,
wherein the first support elements and the second support elements can move vertically up and down relative to each other for furthermore assuming a receiving position in which the first support edges and the second support edges are positioned at the same vertical level,
wherein the first support edges are positioned at the same vertical level, in an absolute sense, in the first presentation position as the vertical level at which the first support edges are positioned in the receiving position and/or wherein the second support edges are positioned at the same vertical level, in an absolute sense, in the second presentation position as the vertical level at which the second support edges are positioned in the receiving position.

12. A system for automated loading of a carrier with different products, comprising a system according to claim 11, a supply conveyor for supplying products to be loaded to a transfer location of the device, a loading location for accommodating a carrier to be loaded, and a manipulator provided with a number of fingers for transferring products to be loaded from the transfer location to the loading location.

13. A device for presenting a product to a manipulator, which manipulator is provided with a plurality of fingers for supporting the product during manipulation of the product, said device comprising:
a transfer location comprising a plurality of mutually parallel first support elements, each having an elongated horizontal first support edge, and a plurality of second support elements extending parallel to each other and perpendicular to said first support elements, each second support element having an elongated horizontal second support edge,
wherein the first support elements and the second support elements can move vertically up and down relative to each other for assuming a first presentation position in which the first support edges are positioned higher than the second support edges, and a second presentation position in which the second support edges are positioned higher than the first support edges, and
wherein spaces are present between the first support elements when the first and second support elements assume the first presentation position, and wherein spaces are present between the second support elements when the first and second support elements assume the second presentation position, in which spaces the fingers of the manipulator can be inserted for picking up a product,
wherein the transfer location comprises a number of third support elements each having a supporting surface and each being provided between two adjacent first support elements and between two adjacent second support elements, wherein said third support elements can be moved vertically up and down relative to the first support elements and the second support elements, wherein the first support edges are positioned higher than the supporting surfaces in the first presentation position and wherein the second support edges are positioned higher than the supporting surfaces in the second presentation position.

14. A device according to claim 13, wherein the third support elements can move vertically up and down relative to the first support elements and the second support elements so as to further assume a further receiving position in which the supporting surfaces are positioned at least at the same vertical level as at least one of the first support edges and as the second support edges.

15. A device according to claim 14, wherein the supporting surfaces are positioned at most 1 cm higher than at least one of the first support edges and the second support edges in said further receiving position.

16. A device according to claim 15, wherein the first support edges are positioned at the same vertical level, in an absolute sense, in the first presentation position as the vertical level at which the first support edges are positioned in said further receiving position and/or wherein the second support edges are positioned at the same vertical level, in an absolute sense, in the second presentation position as the vertical level at which the second support edges are positioned in said further receiving position.

17. A device according to claim 13, wherein the supporting surfaces have a rectangular shape.

18. A device according to claim 13, wherein the supporting surfaces are slightly inclined towards the centre of the supporting surface along at least part of their circumference.

19. A method for automated loading of a carrier with different products, comprising the steps of
- (A) determining a group of products to be loaded on a carrier,
- (B) determining an optimum position for each of the products of the group according to step A and an optimum orientation for loading the product in question on the carrier,
- (C) determining an optimum sequence for loading the individual products from the group according to step A on the carrier,
- (D) automated supplying of the products from the group according to step A to a transfer location in the optimum sequence according to step C,
- (E) causing fingers of a manipulator to approach a product supplied according to step D from one of at least two possible first directions of approach to the product in dependence on the optimum orientation according to step B,
- (F) moving the fingers under the product in question from a respective first direction of approach,
- (G) causing the fingers to pick up the product in question,
- (H) causing the manipulator to move the product to a carrier,
- (I) causing the fingers carrying the product to approach the carrier to be loaded from a second direction of approach to the carrier,
- (J) removing the product in question from the fingers, thereby loading the carrier with the product, such that the product in question takes up the optimum position and the optimum orientation determined in step B,
- (K) repeating steps E-J for each of the products forming part of the group according to step A, with the second direction of approach being the same for each of the products.

20. The method according to claim 19, wherein in repeating said step E according to said step K, said one of said first and second directions is different from said one of said first and second directions in said step E.

* * * * *